(12) United States Patent
Shim et al.

(10) Patent No.: US 7,761,810 B2
(45) Date of Patent: Jul. 20, 2010

(54) METHOD AND APPARATUS FOR PROVIDING TOUCH SCREEN USER INTERFACE, AND ELECTRONIC DEVICES INCLUDING THE SAME

(75) Inventors: Jung-hyun Shim, Seongnam-si (KR); Gyung-hye Yang, Seoul (KR); Hyun-jeong Lee, Yongin-si (KR); Joon-ah Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 394 days.

(21) Appl. No.: 11/435,988

(22) Filed: May 18, 2006

(65) Prior Publication Data

US 2007/0013672 A1    Jan. 18, 2007

(30) Foreign Application Priority Data

Jul. 18, 2005    (KR)    ...................... 10-2005-0064956

(51) Int. Cl.
*G06F 3/048* (2006.01)

(52) U.S. Cl. .................. 715/827; 715/847; 715/810; 715/811; 715/815; 715/825; 715/826; 715/858; 715/864

(58) Field of Classification Search ................. 715/827, 715/716, 762, 763, 810, 811, 815, 825, 826, 715/847, 858, 864, 866; 345/173
See application file for complete search history.

(56) References Cited

U.S. PATENT DOCUMENTS

| | | | |
|---|---|---|---|
| 5,644,739 A * | 7/1997 | Moursund | 715/840 |
| 6,154,214 A * | 11/2000 | Uyehara et al. | 715/863 |
| 6,377,286 B1 * | 4/2002 | Hochmuth | 715/810 |
| 6,590,568 B1 * | 7/2003 | Astala et al. | 345/173 |
| 6,757,002 B1 * | 6/2004 | Oross et al. | 715/864 |
| 6,781,575 B1 * | 8/2004 | Hawkins et al. | 345/173 |
| 2003/0103038 A1 * | 6/2003 | Wong et al. | 345/158 |
| 2005/0227762 A1 * | 10/2005 | Tahara et al. | 463/30 |
| 2007/0013665 A1 * | 1/2007 | Vetelainen et al. | 345/169 |
| 2007/0018963 A1 * | 1/2007 | Spencer | 345/173 |

FOREIGN PATENT DOCUMENTS

| | | |
|---|---|---|
| JP | 2001-331262 | 11/2001 |
| JP | 2002-112361 | 4/2002 |
| KR | 10-2002-0019613 | 3/2002 |
| KR | 10-2003-0029765 | 4/2003 |

* cited by examiner

*Primary Examiner*—Weilun Lo
*Assistant Examiner*—Rashedul Hassan
(74) *Attorney, Agent, or Firm*—Staas & Halsey LLP

(57) ABSTRACT

A method and an apparatus for providing a touch-screen user interface, and an electronic device using the method. The method includes receiving a touch-screen position of a hotkey for executing a specific function, which is input via a user's touch, and creating the hotkey at the specified position.

22 Claims, 12 Drawing Sheets

METHOD AND APPARATUS FOR PROVIDING TOUCH SCREEN USER INTERFACE, AND ELECTRONIC DEVICES INCLUDING THE SAME

CROSS-REFERENCE TO RELATED APPLICATION

This application is based on and claims priority from Korean Patent Application No. 10-2005-0064956 filed on Jul. 18, 2005, the disclosure of which is incorporated herein by reference.

BACKGROUND OF THE INVENTION

1. Field of the Invention

The present invention relates to a method and an apparatus for providing a touch screen user interface. More particularly, the present invention relates to a method and an apparatus for providing a touch screen user interface whereby a user interface is generated and its position is changed by a tap on a screen by a user, and an electronic device including the same.

2. Description of Related Art

In conventional digital products, user interfaces are not user-friendly but are based on functions. That is, a function is manipulated in the same manner regardless of a user's skill or preference. For example, it would be very inconvenient to use a frequently used function if the function requires a complicated menu manipulation. To improve convenience, there have been some attempts to create hotkeys for frequently used functions.

Methods of setting hotkeys for frequently used functions are disclosed in several patents. As an example, Korean Unexamined Patent Publication No. 2003-0029765 discloses an apparatus and a method of setting hotkeys for some frequently used functions of a data terminal. However, in this invention only a small fixed number of menus can be set with hotkeys and the hotkeys can only be created in fixed positions. Accordingly, a user cannot create shortcut menus in the desired positions, and thus the user's skill and preference are still not reflected, and the user interface is still inconvenient for the user.

BRIEF SUMMARY

In view of the above, it is an object of the present invention is to provide a method and an apparatus providing a touch screen user interface that allows a user to generate a hotkey in any position desired by the user as the hotkey position is input by a screen touch by the user.

It is another object of the present invention is to provide a method and an apparatus providing a touch screen user interface that allows a user to create as many hotkeys as the menus the user desires, without limitation to the number hotkeys.

According to an aspect of the present invention, there is provided a method of providing a touch screen user interface, the method including: (a) providing a touch-sensitive user interface for creation of a hotkey for executing a specific function, on a touch screen; (b) receiving a position on the touch screen for the hotkey to be created, the position being input via a user's touch; and (c) displaying a created hotkey at the input position.

According to another aspect of the present invention, there is provided an apparatus for providing a touch screen user interface, the apparatus including: a control section providing, on a touch screen, a user interface for creation of a hotkey for a specific function; a touch sensing section receiving, via a user's touch, an input position of the hotkey on the touch screen; and a display control section displaying a created hotkey at the input position.

According to a further aspect of the present invention, there is provided an electronic device providing a touch screen user interface, the device including: a control unit providing a user interface for creation, on a touch screen, of a hotkey for executing a specific function; and a touch sensing section receiving a touch-screen position of the hotkey, which is input via a user's touch. The control unit creates the hotkey for display at the input position.

According to another aspect of the present invention, there is provided a computer-readable storage medium encoded with processing instructions for causing a processor to execute the aforementioned method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Embodiments of the present invention are described hereinafter with reference to flowchart illustrations of user interfaces, methods, and computer program products. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur in an order that differs from those described below. For example, two blocks shown in succession may in fact be executed substantially concurrently or the blocks may sometimes be executed in reverse order, depending upon the functionality involved.

In the description that follows, an example of an electronic device containing a unit that provides a touch screen user interface is described. The description is given using a digital camera as an example. However, this is a non-limiting example of an electronic device having the touch screen user interface.

FIGS. 1A-E are drawings illustrating the process of creating a hotkey in a touch screen user interface according to an embodiment of the present invention.

Figure 1A:
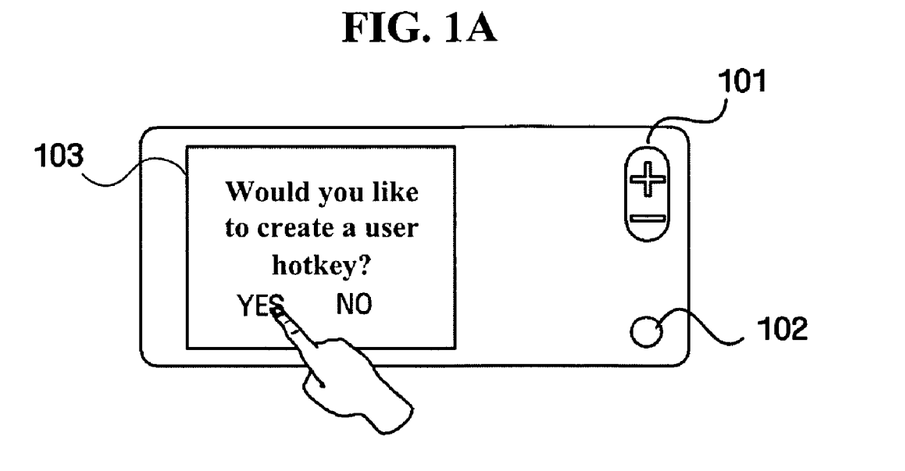
FIGS. 1A-1E illustrate automatic generation of a hotkey using a method of providing a touch screen user interface according to an embodiment of the present invention.
Figure 1B:
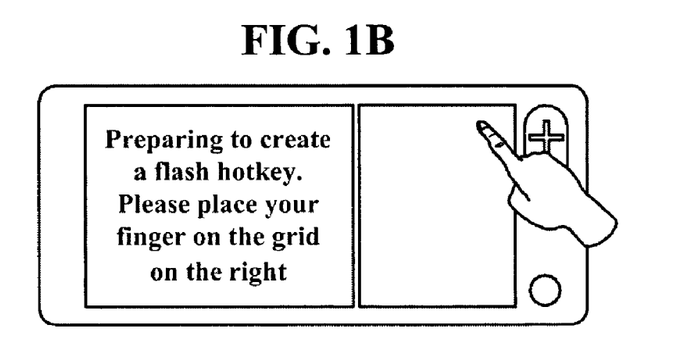
Figure 1C:
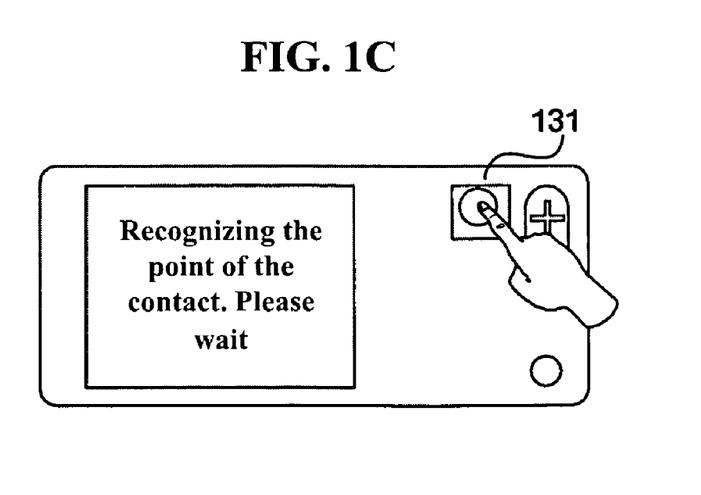
Figure 1D:
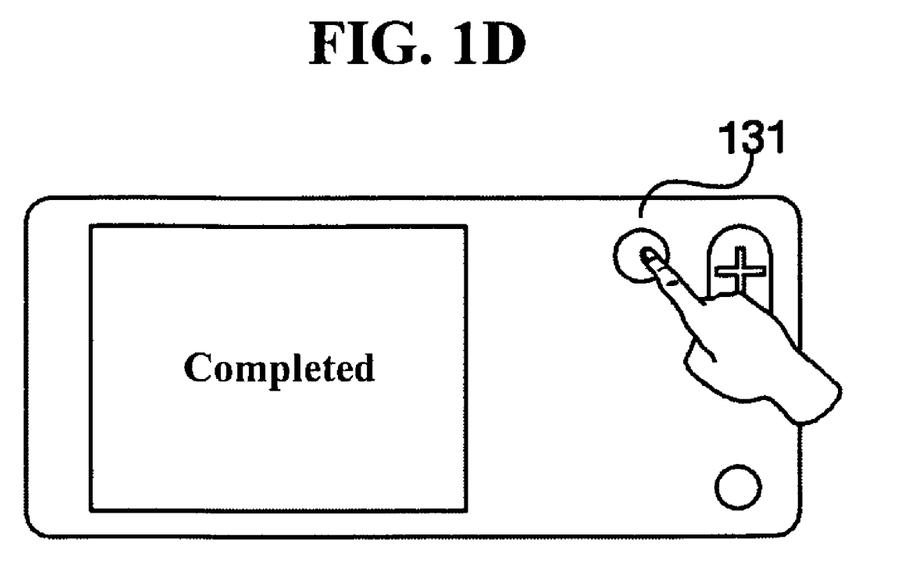
Figure 1E:
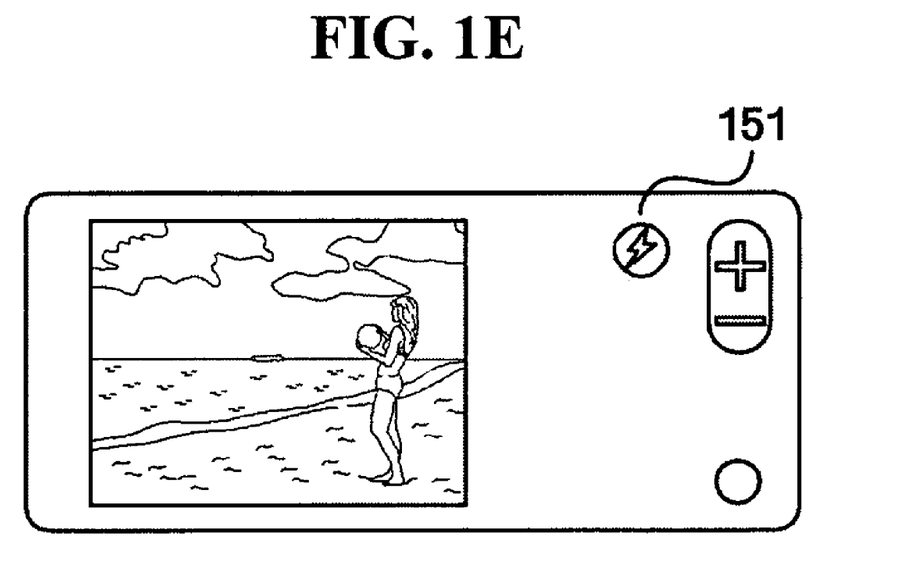

The digital camera illustrated in FIGS. 1A-1E is a basic user interface comprising a zoom button 101, a manual menu setting mode switch button 102, and a display region 103 that displays an image. The camera asks the user whether to create a hotkey for a flash function if the function has been frequently used by the user (FIG. 1A). If the answer is "yes", the camera instructs the user to touch a position on the touch screen to create a hotkey for the flash function (FIG. 1B). Once the user has touched a position 131, the camera recognizes the position of the finger (FIG. 1C) and (FIG. 1D) and creates a hotkey icon 151 (FIG. 1E).

In the embodiment illustrated in FIGS. 1A-1E, the user is suggested to create a hotkey when the frequency of use of a specific function exceeds the predetermined value and the hotkey has not been created. If the user wishes to create a hotkey to a specific menu, the user may switch to a menu setting mode and create the hotkey regardless of the frequency of use. An example thereof will be described in detail with reference to FIGS. 2A-2G.

Figure 2A:
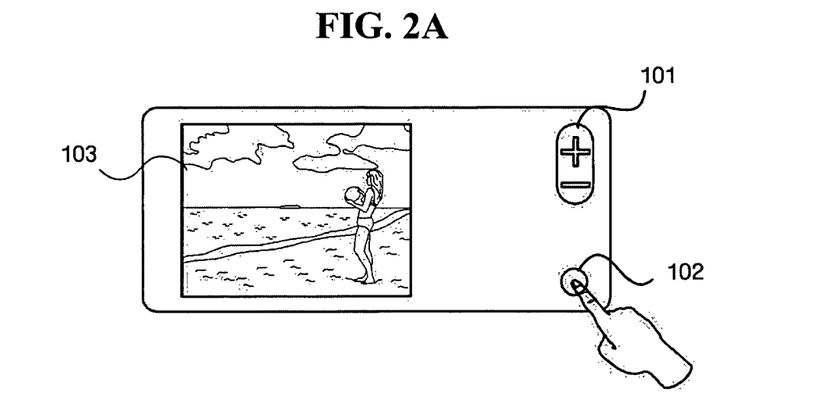
FIGS. 2A-2G illustrate manual generation by a user of a hotkey using the method of providing the touch screen user interface according to an exemplary embodiment of the present invention.
Figure 2B:
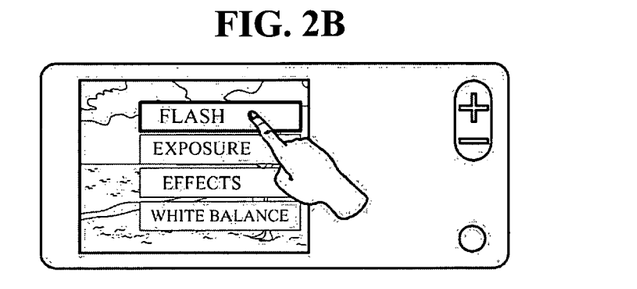
Figure 2C:
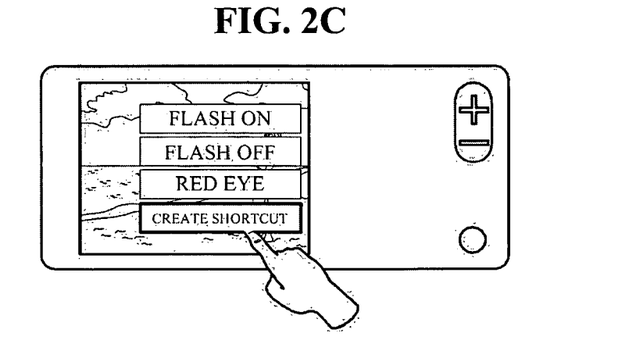
Figure 2D:
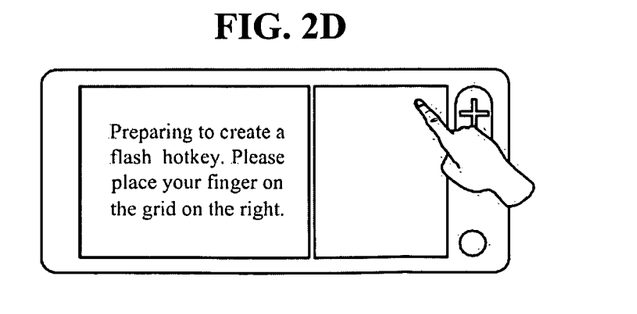
Figure 2E:
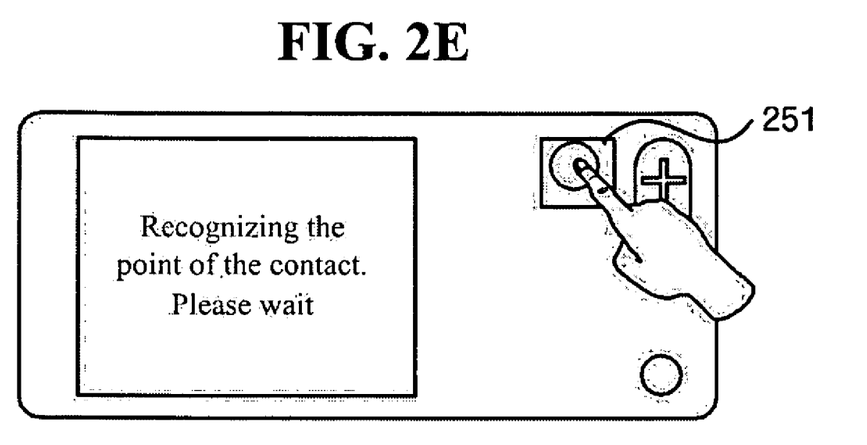
Figure 2F:
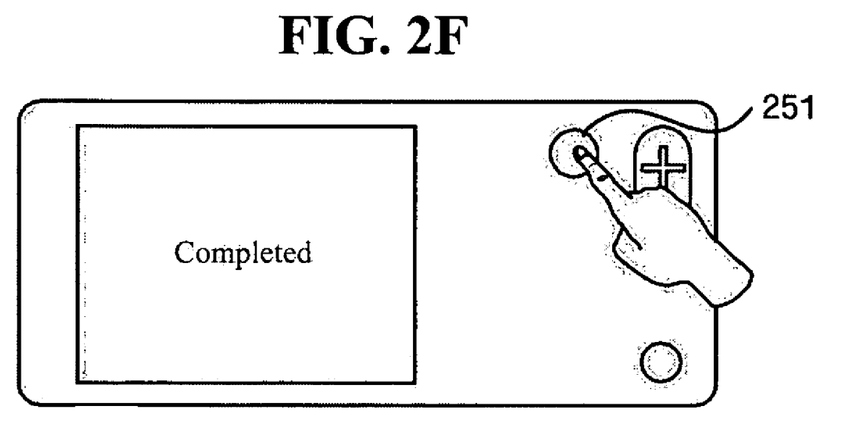
Figure 2G:
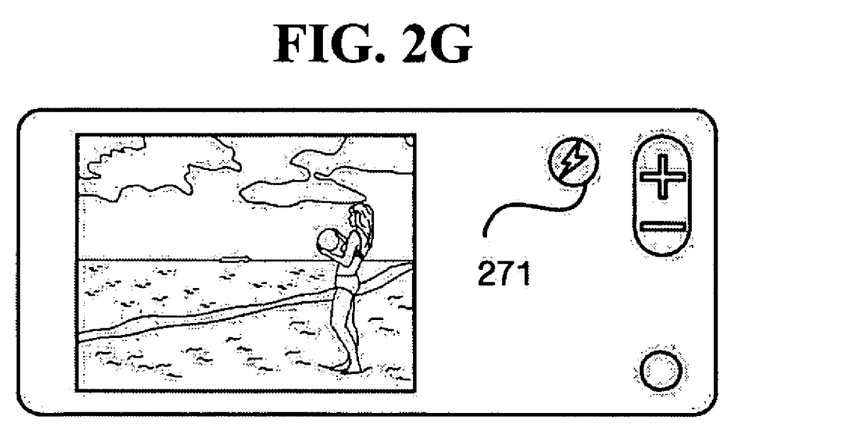

FIGS. 2A-2G are drawings illustrating the process of manually creating a hotkey in a touch screen user interface according to an embodiment of the present invention. The user switches to a menu setting mode (FIG. 2A) by pressing the button 102 and selects a menu to create a hotkey (FIGS. 2B and 2C). If the user wishes to create the hotkey to a flash function, the user selects a flash setting menu as in (FIG. 2B) and then selects a user button customized menu (FIG. 2C). The camera then instructs the user to touch a position on the screen to create the hotkey to the flash function as in (FIG. 2D). Once the touched position has been recognized (FIGS. 2E and 2F), the camera creates the hotkey for the flash function 271 at that position (FIG. 2G).

Figure 3A:
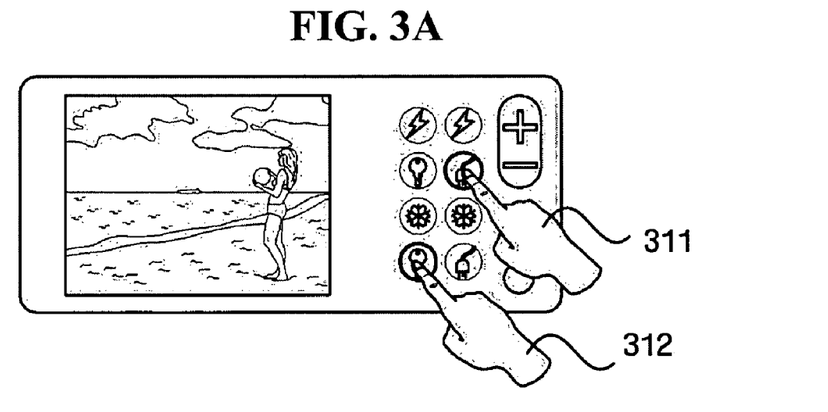
FIGS. 3A-3C illustrate the change of a hotkey of a touch screen.
Figure 3B:
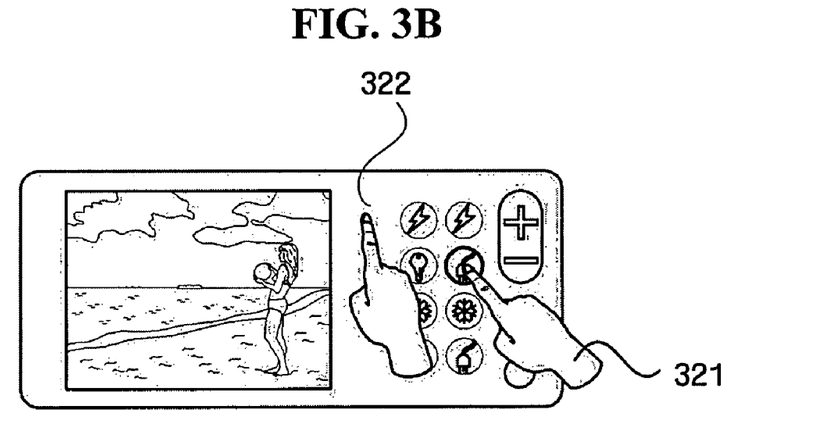
Figure 3C:
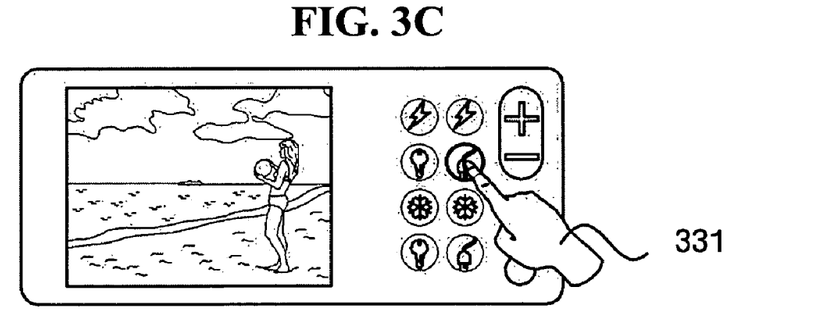

The hotkey created by the processes illustrated in FIGS. 1A though 2G may be transposed or deleted by a tap of a screen. FIGS. 3A-3C are drawings illustrating an exemplary embodiment of customizing a created hotkey icon on the touch screen.

FIG. 3A illustrates two hotkeys 311 and 312 switching positions, FIG. 3B illustrates transposing the hotkey 321 to another place on the touch screen 322, and FIG. 3C illustrates deleting the hotkey 331. If the user wishes to transpose the positions of the two hotkeys, the user touches one of the hotkeys 311 firmly. The firmly touched hotkey blinks indicating to the user that it has been switched over to a menu modification mode. The user then softly touches the other one of the hotkeys 312 which will eventually be transposed to 311. Then the hotkey 311 and 312 transpose their positions.

The user transposes the hotkey to any space on the screen by firmly touching the hotkey to move as in 321 in order to switch to a hotkey modification mode, and touching any space on the screen as in 322 to transpose the hotkey. The user can also delete the hotkey by firmly touching the hotkey to delete as in 331, and touching the same hotkey again. Doubly touching the hotkey, it is to be understood, is merely a non-limiting example of the present embodiment.

Figure 4:
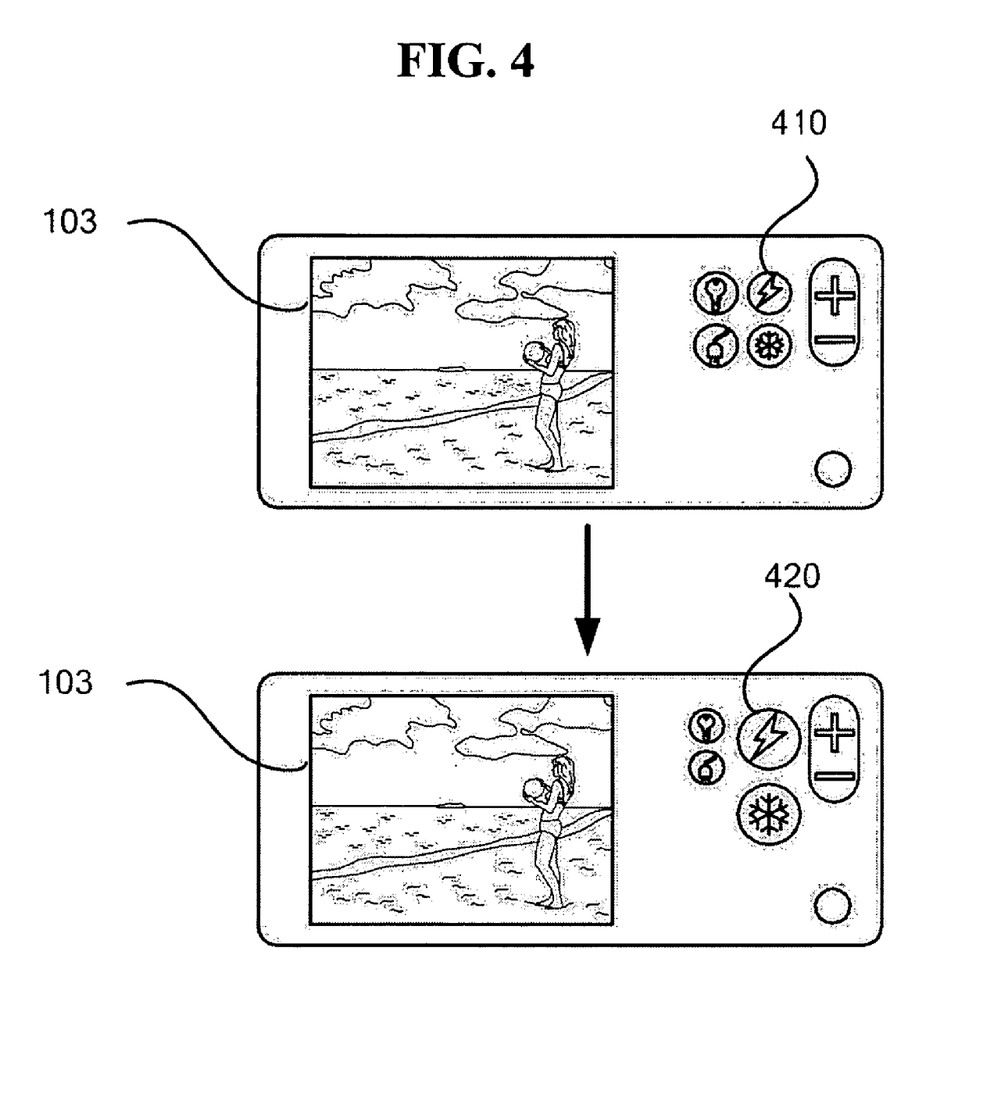
FIG. 4 illustrates the change of a displayed hotkey as the frequency of use of the specific hotkeys increases.

FIG. 4 is a drawing illustrating a hotkey being adjusted according to the frequency of use.

Once a hotkey to a flash function 410 has been created on a touch screen and the shortcut has been frequently used, a user may enlarge the size of the hotkey. For instance, the diameter of the hotkey could be 8 mm when the frequency of use is less than 2, the diameter could be 10 mm when the frequency of use is between 3 and 5, and the diameter be 13 mm when the frequency of use is greater than 6. As the frequency of use increases, the size of the hotkey increases to a size of a button 420 according to a default value. By displaying the frequently used hotkey bigger than other hotkeys, it will be easier for a user to recognize the hotkey, which increases convenience.

Figure 5:
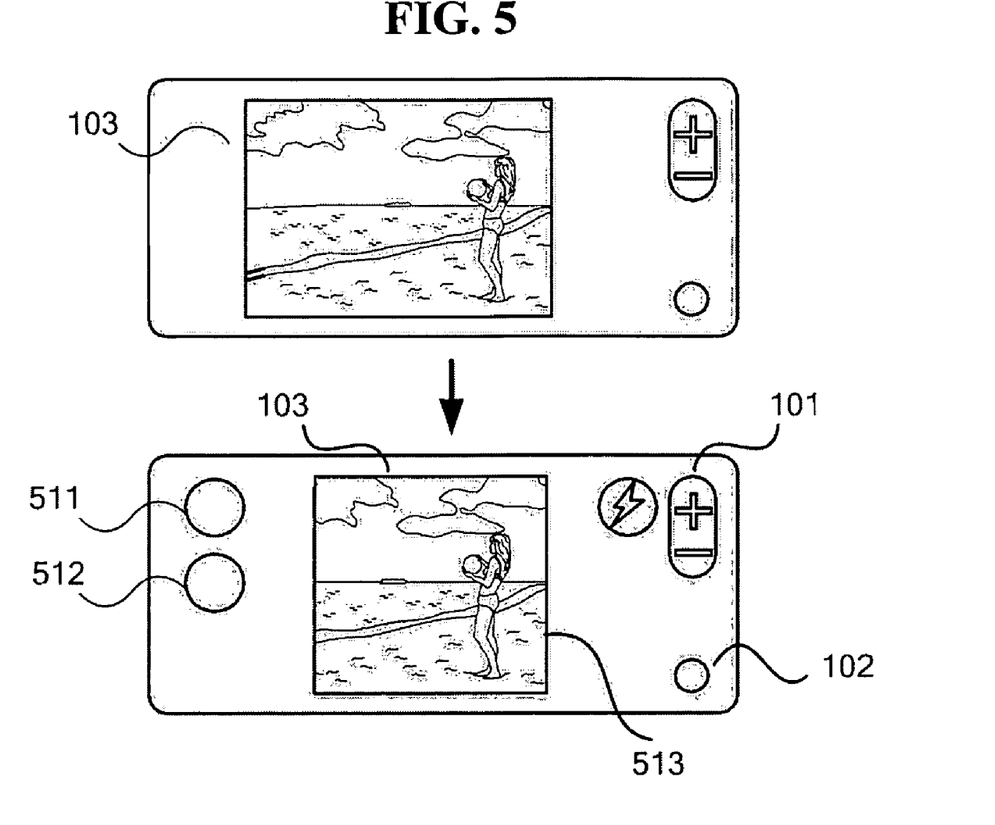
FIG. 5 illustrates a reduction in the size of a display region as hotkey of the touch screen increases.

The size of a display region 103, which displays an image, may be adjusted as a new hotkey is created or the size of a hotkey is adjusted according to the frequency of use. FIG. 5 illustrates the display region 103 diminishing in size to accommodate an additional space taken up by an enlarged hotkey.

When a digital camera is used for the first time, the digital camera provides only a zoom button 101, a manual menu setting mode button 102, and a display region 103 that displays an image on the back panel of the digital camera, as shown in FIG. 5. When a hotkey for a frequently used function is created in a space on a touch screen, it is created on the back panel of the digital camera. If the user wishes to create a hotkey in the display region and if there is space available, the display region may be transposed. But if there is no space available, the display region may diminish i.e. when hotkey buttons 511 and 512 are created in the display region 103, the display region 103 may diminish in response to the newly created hotkeys 513.

Figure 6:
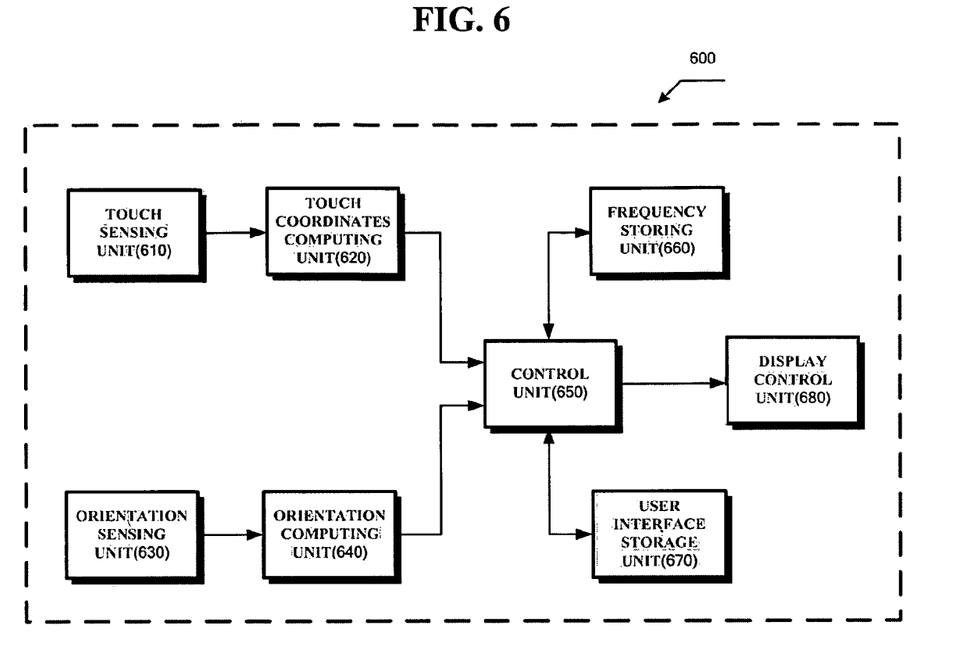
FIG. 6 is a block diagram illustrating the touch screen user interface module according to an embodiment of the present invention.

FIG. 6 is a block diagram illustrating the configuration of an apparatus for providing a touch screen based user interface according to an embodiment of the present invention.

The apparatus for providing the touch screen based user interface according to an embodiment of the present invention may comprise a touch sensing unit 610, a touch coordinates computing unit 620, an orientation sensing unit 630, an orientation computing unit 640, a control unit 650, a frequency storing unit 660, a user interface storage 670, and a display control unit 680.

The touch sensing unit 610 detects contact on the touch screen. A resistive system or a capacitive system may be employed to detect contact. The touch sensing unit 610 even detects a slight contact, and delivers information on the coordinates of the point of contact to the touch coordinates computing unit 620. When the resistive system is employed, the touch sensing unit 610 is able to detect contact with any conductive object, in addition to contact with a body part.

The touch coordinates computing unit 620 translates the point of the contact into coordinates on the touch screen based on information received from the touch sensing unit 610.

When a user holds a digital camera in a horizontal position and then rotates it to a vertical position, an orientation sensing unit 630 detects the switched orientation and provides this information to an orientation computing unit 640. The new orientation may be detected using an acceleration sensor or an angular velocity sensor. The orientation computing unit 640 computes the new orientation according to information on the changed acceleration and the angular velocity, and provides this information to a control unit 650.

The frequency storage 660 stores the frequency of use of each menu provided by the electronic device. When the electronic device is shared among multiple users, the frequency storage 660 stores the use frequency of each user and is able to provide a user interface according to the use history of the user.

The user interface storage 670 stores information on positions of all elements on the touch screen, which includes the hotkeys and the display region. When an electronic device is shared among multiple users, the user interface storage 670 provide a customized user interface that fits each user's needs by storing information on the position of each element and managing it.

A control unit 650 receives the coordinates of the point of contact on the touch screen and creates the hotkey in the corresponding space. The control unit 650 then receives information on the positions of the existing element of the user interface from the user interface storage 670 and anticipates the changes made to the existing user interfaces according to the creation of the hotkey. When the new hotkey is created, requires repositioning of other menus as well as the display region of the user interface, as illustrated in FIG. 5, the control unit 650 stores information on the repositioned user interface with the hotkey in the user interface storage 670.

The control unit 650 receives the new orientation of the electronic device from the orientation computing unit 640, repositions the existing user interface according to the switched orientation, and stores information on the repositioned user interface storage 670. In other words, if the user switches from a horizontal mode to a vertical mode, the user interface may be repositioned according to the vertical mode. It would be inconvenient otherwise.

In addition, the control unit 650 manages the frequency of use of each menu by either creating the hotkey for the frequently used menu, or adjusting the size of the shortcut previously created as illustrated in FIG. 1 and FIG. 4.

Each component illustrated in FIG. 6, means, but is not limited to, a software or hardware component, such as a Field Programmable Gate Array (FPGA) or an Application Specific Integrated Circuit (ASIC), which performs certain tasks. A component may advantageously be configured to reside in an addressable storage medium and configured to execute on one or more processors. The functionality provided for in the components may be combined into fewer components and/or further separated into additional components.

Figure 7:
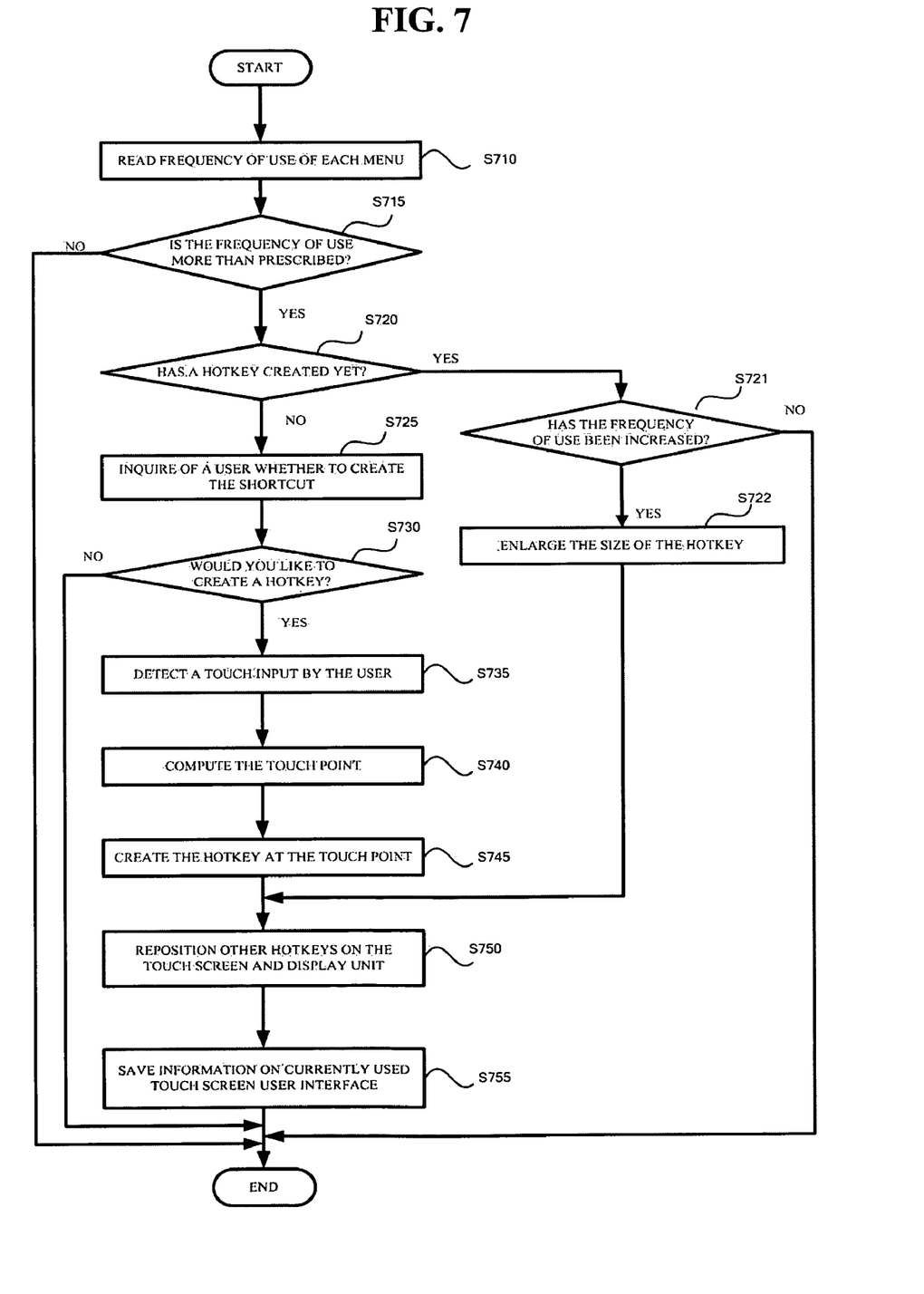
FIG. 7 is a flowchart showing a touch screen user interface providing method that automatically generates a hotkey according to an embodiment of the present invention.

FIG. 7 is a flowchart illustrating the process of automatically creating a hotkey according to a suggestion by an electronic device in a method for providing a touch screen user interface according to an embodiment of the present invention. Referring to FIGS. 6 and 7, when the device is switched on, a control unit 650 reads frequency of use records from a frequency of use storage 660 S710. When the frequency of use of a specific menu is more than prescribed as in S715, the control unit 650 detects whether a hotkey for the frequently used menu has been created. If the frequency of use is not more than prescribed in S715, the process ends. If a hotkey has not yet been created yet S720, the control unit 650 suggests that the user create a hotkey.

If the user agrees (Yes in S730), a touch sensing unit 610 detects contact S735 and a touch coordinates computing unit 620 computes the coordinates of the point of contact, as described in FIG. 6. If the user does not agree (No in S720) the process ends.

The electronic device creates the shortcut on the touch screen S745, and adjusts positions of other existing menus or the display region S750. The control unit 650 stores information on the touch-screen positions of the user interface elements, including the new hotkey in the user interface storage 670 S755.

If the hotkey for the frequently used menu has already been created on the touch screen (when Yes in S720) and if the frequency of use has increased (Yes) in S721, the size of the hotkey is enlarged and displayed S722.

Figure 8:
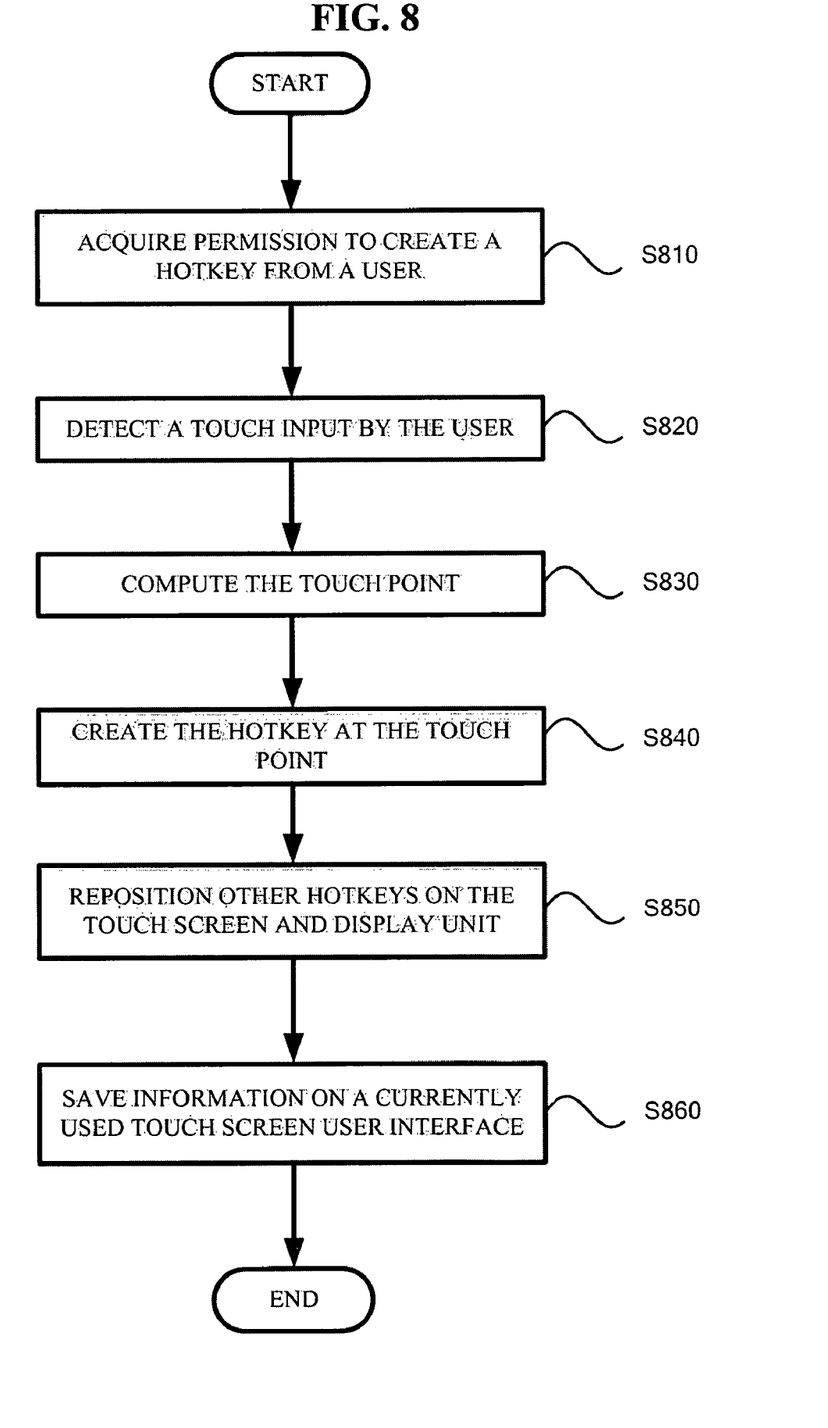
FIG. 8 is a flowchart showing a touch screen use interface providing method that manually generates a hotkey according to an embodiment of the present invention.

FIG. 8 is a flowchart illustrating the process of manually creating a hotkey in a method for providing a touch screen user interface according to an embodiment of the present invention.

If a user switches to a manual mode enabling manual creation of a hotkey by pressing a button, the electronic device obtains information about which function the user wishes to creates a hotkey for S810. In order to obtain information on the intended position of the new hotkey, a touch on the touch screen is sensed and the coordinates of the point of contact are calculated, as described in FIG. 6 (S820 and S830).

The new hotkey is created on the coordinates corresponding to the point on the touch screen S840 and the positions of other hotkeys or a display region are adjusted to accommodate the newly created hotkey S850. A control unit 650 stores information on the positions of the elements of the user interface in a user interface storage 670 as in S860.

Figure 9:
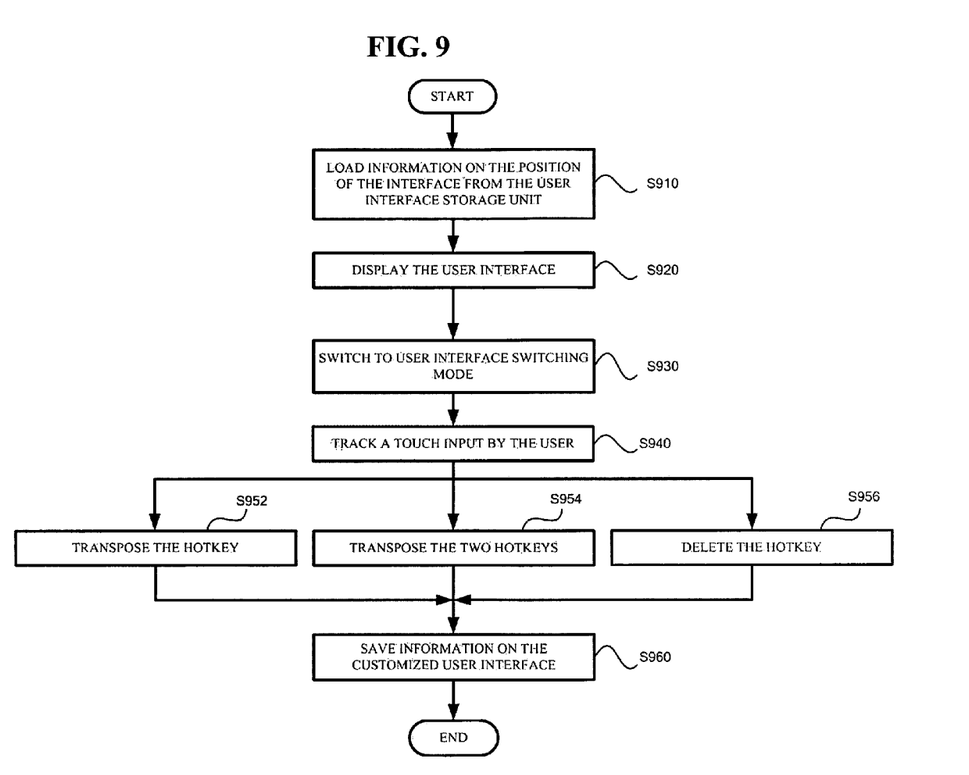
FIG. 9 is a flowchart showing a change of the hotkey of the touch screen.

FIG. 9 is a flowchart illustrating the process of customizing an icon for a new hotkey on a touch screen.

Referring to FIGS. 6 and 9, a control unit 650 loads information on a user interface from a user interface storage 670 S910, and displays the user interface on the touch screen S920. When the device is switched to a customize-interface mode S930, a touch is sensed S940. The switch can be made by firmly touching a customized-interface hotkey. As shown in FIG. 3A, if the user firmly touches a hotkey and touches another, the positions of the two hotkeys are transposed S954. If the user firmly touches a hotkey and touches a space on a touch screen as shown in FIG. 3B, the hotkey is transposed to the space on the touch screen S952. As shown in FIG. 3C, if the user firmly touches a hotkey and then touches the same hotkey again, the hotkey is deleted S956.

The control unit 650 stores information on the new positions of elements of the user interface after the repositioning and the deletion in the user interface storage 670 S960.

Figure 10:
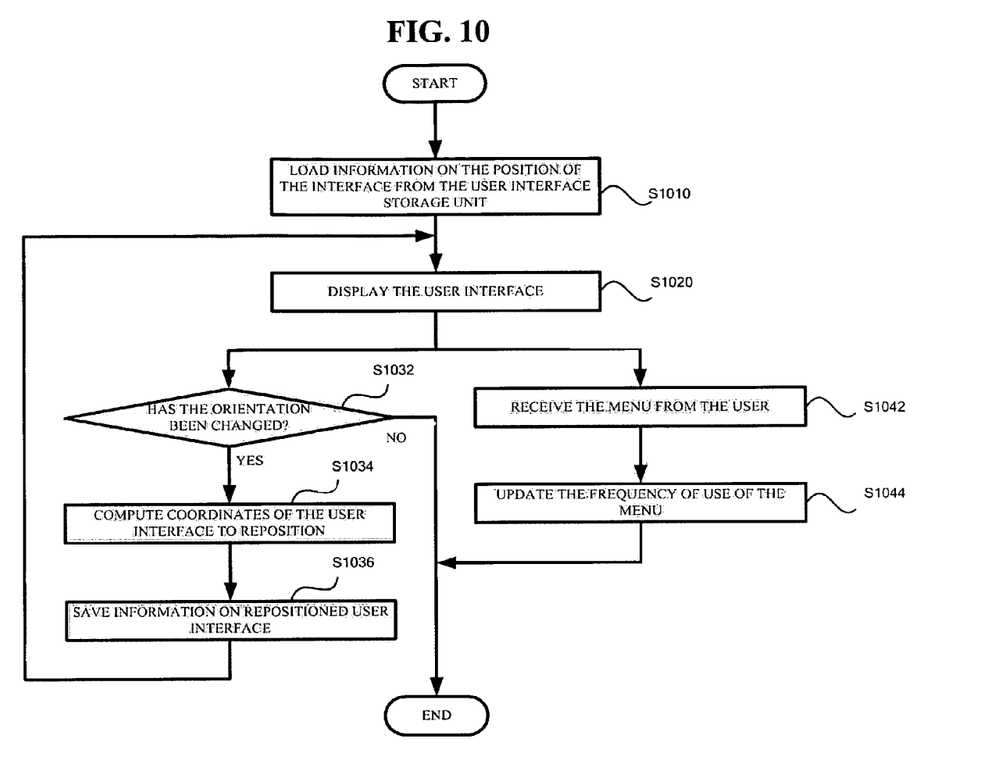
FIG. 10 is a flowchart showing operations of an apparatus comprising a touch screen in a function execution mode.

FIG. 10 is a flowchart illustrating operations on an electronic device comprising a touch screen, which is set to a function execution mode.

Referring to FIGS. 6 and 10, a control unit 650 loads up information on the position of a user interface in a user interface storage unit 670 S1010 and displays the user interface S1020. If the orientation of the device has been changed S1032, the control unit 650 computes the new positions of the elements of the user interface according to the new orientation S1034, and stores information on the positions of the elements off the customized user interface in the user interface storage 670 as in S1036.

If the user selects a specific function S1042, the control unit updates the frequency of use of the function S1044. Such updated frequency of use of each function is reflected when creating and customizing hotkeys.

According to a method and an apparatus for providing a touch screen based user interface according to the above-described embodiments, the following effects can be anticipated.

First is the provision of a touch-sensitive user interface reflecting the customized needs of a user by allowing the user to create a hotkey on any spot of a touch screen.

Second is that enablement of a user to create a hotkey for any menu.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of providing a touch screen user interface, the method comprising:
   (a) providing a touch-sensitive user interface for creation of a hotkey for executing a specific function, on a touch screen of an image capture device;
   (b) receiving a position on the touch screen for the hotkey to be created, the position being input via a user's touch;
   (c) displaying a created hotkey at the input position; and
   (d) repositioning other elements of the user interface on the touch screen according to the displayed position of the created hotkey,
   wherein the repositioning of other elements comprises changing physical size of a display region which displays a captured image or an image to be captured on the touch screen according to the displayed position of the created hotkey.

2. The method of claim 1, wherein operation (a) comprises:
   detecting a position of the user's touch on the touch screen; and
   computing coordinates of the touched position.

3. The method of claim 1, wherein operation (a) comprises automatically providing a user interface suggesting creation of the hotkey, when the frequency of use of the specific function exceeds a predetermined value.

4. The method of claim 1, further comprising storing position information of elements of the user interface including the created hotkey on the screen.

5. The method of claim 1, further comprising, after displaying the hotkey, customizing the created hotkey.

6. The method of claim 5, wherein the customizing the created hotkey comprises:

selecting the created hotkey via a user's touch;
receiving a new position to which the created hotkey is to be moved, the new position being input via a user's touch; and
moving the created hotkey to the new position.

7. The method of claim 5, wherein the customizing the created hotkey comprises:
   selecting, via a user's touch, a first hotkey;
   selecting, via the user's touch, a second hotkey; and
   transposing positions of the first hotkey and the second hotkey.

8. The method of claim 5, wherein the customizing the created hotkey comprises:
   receiving a selection of the created hotkey selected via a user's touch; and
   deleting the selected hotkey.

9. The method of claim 1, further comprising enlarging the created hotkey when the frequency of use of the hotkey increases.

10. The method of claim 1, further comprising repositioning the user interface on the touch screen which includes the created hotkey, according to whether the orientation of the apparatus has changed.

11. An apparatus for providing a touch screen user interface, the apparatus comprising:
    a touch screen of an image capture device;
    a control section providing, on the touch screen, a user interface for creation of a hotkey for a specific function;
    a touch sensing section receiving, via a user's touch, an input position of the hotkey on the touch screen; and
    a display control section to control display of a created hotkey at the input position on the touch screen,
    wherein the control section repositions other elements of the user interface on the touch screen according to the displayed position of the created hotkey, and
    wherein the control section changes physical size of a display region which displays a captured image or an image to be captured on the touch screen according to the displayed position of the created hotkey.

12. The apparatus of claim 11, wherein the touch sensing section comprises:
    a touch sensing unit detecting the user's touch on the touch screen; and
    a touch coordinates computing unit computing coordinates of the touched position.

13. The apparatus of claim 11, wherein the control section automatically provides a user interface suggesting creation of the hotkey when the frequency of use of the specific function exceeds a predetermined value.

14. The apparatus of claim 11, further comprising a storage section storing touch-screen position information of elements of the user interface including the created hotkey on the touch screen.

15. The apparatus of claim 11, wherein the control section changes the created hotkey.

16. The apparatus of claim 11, wherein the control section enlarges the created hotkey when the frequency use of the created hotkey increases.

17. The apparatus of claim 11, further comprising an orientation sensing section repositioning the user interface on the touch screen which includes the created hotkey, according to whether an orientation of the apparatus has changed.

18. The apparatus of claim 17, wherein the orientation sensing section comprises:
    an orientation sensing unit detecting a change in an orientation of the apparatus; and an orientation computing unit computing a new orientation of the user interface on the touch screen based on a detected change.

19. The apparatus of claim 18, wherein the orientation computing unit computes the new orientation of the user interface on the touch screen according to changes in acceleration or angular velocity detected by the orientation sensing unit.

20. An electronic device providing a touch screen user interface, the device comprising:
 a touch screen of an image capture device;
 a control unit providing a user interface for creation, on the touch screen, of a hotkey for executing a specific function; and
 a touch sensing section receiving a touch-screen position of the hotkey, which is input via a user's touch,
 wherein the control unit creates the hotkey for display at the input position,
 wherein the control unit repositions other elements of the user interface on the touch screen according to the touch-screen position of the created hotkey, and
 wherein the control unit changes physical size of a display region which displays a captured image or an image to be captured on the touch screen according to the touch-screen position of the created hotkey.

21. The apparatus of claim 20, further comprising a frequency storage unit storing a frequency of use of each menu provided by the electronic device,
 wherein, when the electronic device is shared among multiple users, the frequency storage unit stores the use frequency of each user so as to provide a user interface for each user based on the user's use history, and
 wherein the control section automatically provides a user interface suggesting creation of the hotkey when a user's use history meets specified criteria.

22. A computer-readable storage medium encoded with processing instructions for causing a processor to execute a method of providing a touch screen user interface, the method comprising:
 (a) providing a touch-sensitive user interface for creation of a hotkey for executing a specific function, on a touch screen of an image capture device;
 (b) receiving a position on the touch screen for the hotkey to be created, the position being input via a user's touch;
 (c) displaying a created hotkey at the input position; and
 d) repositioning other elements of a user interface on the touch screen according to the displayed position of the created hotkey,
 wherein the repositioning of other elements comprises changing physical size of a display region which displays a captured image or an image to be captured on the touch screen according to the displayed position of the created hotkey.

* * * * *